UNITED STATES PATENT OFFICE.

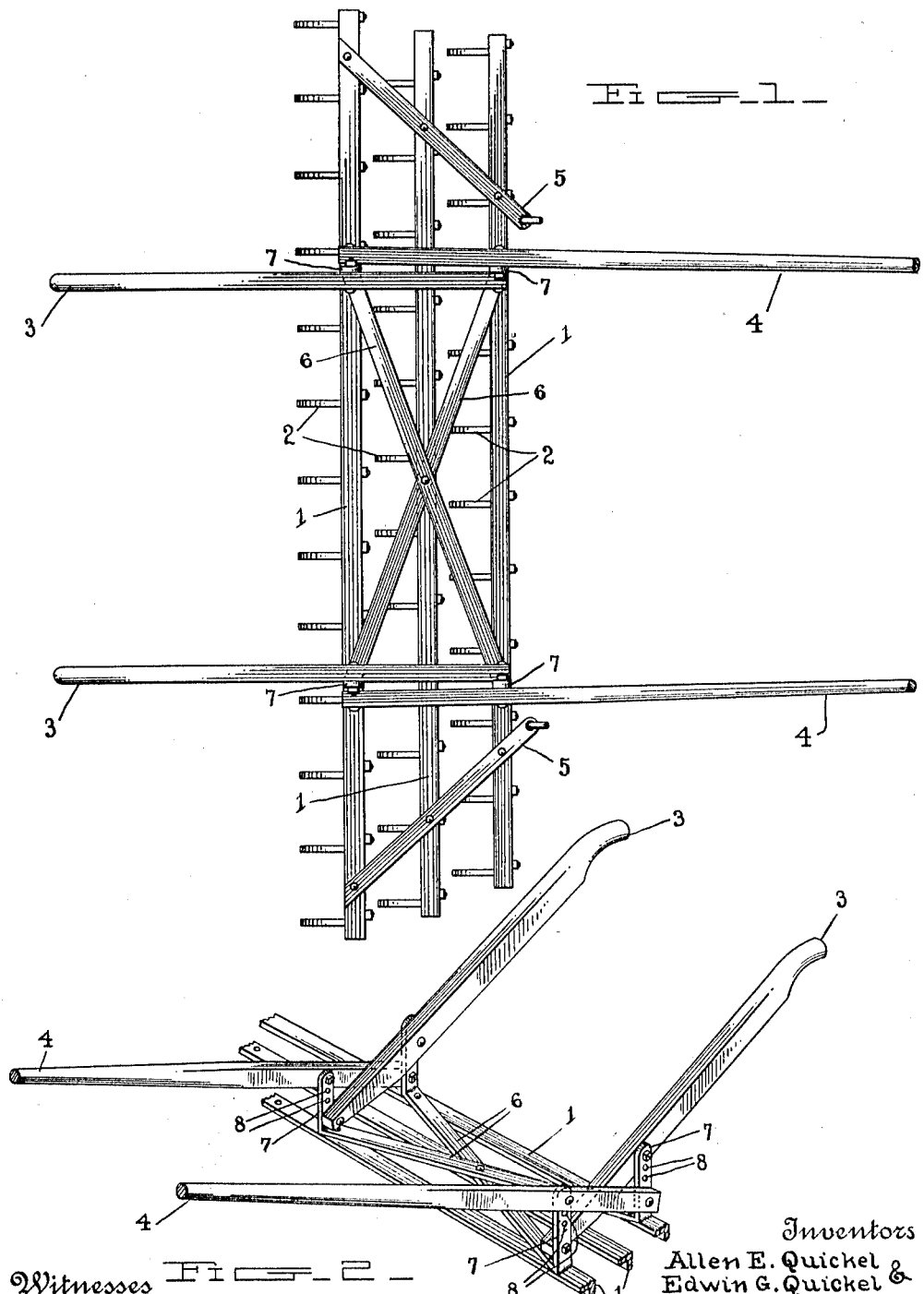

ALLEN E. QUICKEL AND EDWIN G. QUICKEL, OF YORK, PENNSYLVANIA.

WEEDER.

1,001,442.  Specification of Letters Patent.  Patented Aug. 22, 1911.

Application filed February 16, 1911. Serial No. 608,867.

*To all whom it may concern:*

Be it known that we, ALLEN E. QUICKEL and EDWIN G. QUICKEL, citizens of the United States, residing at York, in the county of York and State of Pennsylvania, have invented certain new and useful Improvements in Weeders; and we do declare the following to be a full, clear, and exact description of the invention, such as will enable others skilled in the art to which it appertains to make and use the same.

Our invention relates to agricultural implements and has special reference to weeders of the type shown in Letters-Patent, No. 731,219, granted to us June 16, 1903.

The objects of the present invention are to provide means whereby the tooth bars will be prevented from sagging or bowing downwardly; to provide improved means for attaching the handles and draft bars to the tooth bars, and to generally increase the rigidity of the structure.

A simple and efficient attainment of these several objects is illustrated in the accompanying drawings and the invention consists in certain novel features hereinafter first fully described and then particularly pointed out in the appended claims.

In the drawings: Figure 1 is a plan view of a weeder embodying our improvements; and Fig. 2 is a perspective view of the bracing brackets with portions of the handles and brace bars secured thereto.

The tooth bars 1 are constructed of angle bars and the teeth 2 are attached thereto in the manner disclosed in our aforesaid Letters-Patent or in any other preferred or convenient manner. The handles 3 and draft bars 4 are also of the usual form and bracing links or connecting bars 5 are secured to and extend over the tooth bars near the ends thereof as shown in Fig. 1.

The machine usually consists of three tooth bars and to the center of the middle tooth bar we secure intersecting obliquely arranged bracing brackets 6. These bracing brackets consist of metallic straps or bars secured to each other and to the middle tooth bar at their centers and having their extremities turned upward, as shown at 7, and provided with a plurality of openings 8, said upturned ends being arranged over the front and rear tooth bars respectively. The bracket bars are secured, adjacent their said upturned ends, to the said front and rear tooth bars thereby rigidly connecting the several tooth bars so that the implement will effectually resist the strains to which it is subjected in use. Moreover, the bracing bars or brackets are disposed diagonally with respect to the tooth bars in opposite directions so that they not only bridge the spaces between the bars but intersect at the center of the implement. We thus provide an unyielding support for the weight which is frequently placed upon the frame to hold the teeth in the ground. In weeders, as heretofore constructed, a weight thereon would cause the tooth bars to sag or bow downwardly and as a result the teeth would engage the ground unevenly, the work would be accomplished in an unsatisfactory manner, and one field would have to be gone over many times. By our present arrangement this difficulty is entirely overcome so that should the ground be hard and necessitate the use of a weight to hold the teeth to their work, no springing or bowing of the tooth bars will result but they will be held true by the bracing brackets and the teeth will all enter the earth to the same depth.

The handles and draft bars are secured to the upturned ends of the bracing brackets the handles being secured to the inner sides of the same while the draft bars are secured to the outer sides thereof. The provision of a plurality of openings in the upturned ends of the brackets permits the securing bolts to be inserted at various elevations and the draft bars and handles may, consequently, be arranged at any desired angle. Inasmuch as the handles and draft bars are secured to the same brackets which connect the tooth bars, it will be seen at once that we have produced a very rigid structure and, as these brackets are small enough to fit between the handles and draft bars, no appreciable additional strain is placed upon the draft bars. Moreover, the handles and draft bars are positively held in fixed relation.

Having thus described our invention what we claim is:—

1. In a weeder, the combination with a plurality of tooth bars, of obliquely disposed bracing brackets intersecting at the center of the middle tooth bar and secured rigidly to each of the tooth bars, said brackets having upturned ends, and handles and draft bars secured to said ends.

2. In a weeder, the combination with a plurality of tooth bars, of obliquely disposed bracing brackets intersecting at the center of the middle tooth bar and secured rigidly to each of the tooth bars, said brackets having upturned ends, and handles and draft bars adjustably secured to said ends.

In testimony whereof we have hereunto set our hands in presence of two subscribing witnesses.

ALLEN E. QUICKEL.
EDWIN G. QUICKEL.

Witnesses:
GEORGE L. SPRENKEL,
SAMUEL S. HAY.

Copies of this patent may be obtained for five cents each, by addressing the "Commissioner of Patents, Washington, D. C."